(12) United States Patent
Quah et al.

(10) Patent No.: US 8,191,462 B2
(45) Date of Patent: Jun. 5, 2012

(54) METHOD FOR CONTROLLING A QUANTITY OF WATER TO BE USED FOR THE PURPOSE OF OBTAINING A QUANTITY OF HOT LIQUID

(75) Inventors: Peng Chau Quah, Eindhoven (NL); Thewis M. Westra, Hoogeveen (NL); Thijs De Haan, Drachten (NL); Pieter Berend Bosstad, Hoogeveen (NL); Jean Bart Bleeker, Hoogenveen (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 710 days.

(21) Appl. No.: 12/307,929

(22) PCT Filed: Jun. 27, 2007

(86) PCT No.: PCT/IB2007/052487
§ 371 (c)(1),
(2), (4) Date: Jan. 8, 2009

(87) PCT Pub. No.: WO2008/007278
PCT Pub. Date: Jan. 17, 2008

(65) Prior Publication Data
US 2009/0183639 A1 Jul. 23, 2009

(30) Foreign Application Priority Data
Jul. 11, 2006 (EP) .................................. 06116939

(51) Int. Cl.
*A47J 31/00* (2006.01)
*F24H 1/20* (2006.01)
*H05B 3/78* (2006.01)

(52) U.S. Cl. ................ 99/280; 99/283; 99/300; 99/305; 392/452; 392/441; 222/1; 222/146.2

(58) Field of Classification Search ..................... 99/280, 99/281, 282, 283, 300, 305; 222/1, 52, 54, 222/64, 146.2; 392/451, 458, 442, 447, 441, 392/449, 452
See application file for complete search history.

(56) References Cited

U.S. PATENT DOCUMENTS

| 5,014,611 A | 5/1991 | Illy et al. | |
| 5,738,001 A * | 4/1998 | Liverani | ......................... 99/283 |
| 6,000,317 A | 12/1999 | Van Der Meer | |

(Continued)

FOREIGN PATENT DOCUMENTS

| EP | 0380947 A1 | 8/1990 |
| EP | 0771542 A1 | 5/1997 |
| WO | 2005072575 A1 | 8/2005 |

*Primary Examiner* — Reginald L Alexander (57) ABSTRACT

A beverage maker includes a boiler for containing and heating water and a normally opened thermostat having a sensing member for sensing a temperature of the water, wherein the sensing member is located at a certain distance with respect to a water inlet of the boiler. When the water is heated, and the temperature of the water exceeds a set point of the thermostat, the thermostat closes. As a result, a pumping action is started, where hot water is forced to flow out of the boiler, and where cold water is forced to flow into the boiler. When a front of the cold water reaches the sensing member of the thermostat, the thermostat is triggered to open again, and the pumping action is terminated. By means of the thermostat, the quantity of hot water that is used for the purpose of making a beverage is accurately controlled.

9 Claims, 4 Drawing Sheets

U.S. PATENT DOCUMENTS

| | | | |
|---|---|---|---|
| 7,093,533 B2 * | 8/2006 | Tebo et al. | 99/315 |
| 7,523,695 B2 * | 4/2009 | Streeter et al. | 99/305 |
| 7,578,230 B2 * | 8/2009 | Rahn | 99/282 |
| 7,798,053 B2 * | 9/2010 | Clark et al. | 99/281 |
| 2005/0076788 A1 | 4/2005 | Grant et al. | |

* cited by examiner

METHOD FOR CONTROLLING A QUANTITY OF WATER TO BE USED FOR THE PURPOSE OF OBTAINING A QUANTITY OF HOT LIQUID

FIELD OF THE INVENTION

The present invention relates to a method for controlling a quantity of water to be used for the purpose of obtaining a quantity of hot liquid, and to a device which is adapted to carrying out this method. Among other things, the method according to the present invention is applicable in the field of controlling a quantity of water to be used in a process of preparing a hot beverage.

BACKGROUND OF THE INVENTION

In a process of preparing a hot beverage, both a temperature of the water and a quantity of the water in relation to a quantity of extractable material are important factors. This is particularly true in the case of a process of preparing coffee on the basis of a quantity of ground coffee beans and hot water. In such a case, a proportion between the quantity of ground coffee beans and a quantity of hot water that is conducted through the ground coffee beans is determinative of the strength and aroma of the coffee.

Usually, coffee is prepared by using a coffee maker. A specific type of coffee maker is a coffee maker which is suitable for preparing quantities of coffee on the basis of coffee pads, i.e. envelopes filled with a quantity of ground coffee beans, wherein the envelopes are permeable to liquid. In general, such a coffee maker comprises a sealable brew chamber which is adapted to receiving one or more coffee pads. During operation of the coffee maker, a quantity of hot water is forced to flow through the at least one coffee pad. In the process, the envelope of the coffee pad acts as a filter. In this way, on the basis of the interaction between the hot water and the coffee pad inside the brew chamber, a desired quantity of coffee is obtained.

For the purpose of heating the water to a predetermined temperature, usually a temperature between 90° C. and 96° C., the coffee maker comprises a boiler having an interior space for containing the water, and heating means for heating the water. For the purpose of realizing a flow of water, the coffee maker comprises a pump. The pump, the boiler and the brew chamber are interconnected by means of tubes for transporting water.

A quantity of coffee that is obtained by using the coffee maker is determined by a quantity of hot water that is conducted through the coffee pad(s) during operation of the coffee maker. In view of the fact that it is desired to let the coffee maker supply predetermined quantities of coffee, which are adapted to the dimensions of a coffee cup or a coffeepot to be used for the purpose of receiving coffee from the coffee maker, and that it is desired to let the coffee maker supply coffee of a predetermined strength and aroma, it is important that the quantity of hot water that is that is conducted through the coffee pad(s) during operation of the coffee maker is accurately controlled.

Methods for controlling the quantity of the hot water that is used for the purpose of preparing a hot beverage on the basis of a predetermined quantity of extractable material are known. In many cases, a beverage maker is equipped with a controlling circuit which is adapted to operating the pump in such a way that a total period during which the pump is operated corresponds to a predetermined period which is representative of a predetermined quantity of water.

For example, U.S. Pat. No. 6,000,317 discloses a coffee maker having a water reservoir for containing cold water, a heating chamber for heating a quantity of water, and a pump for pumping water from the reservoir through the heating chamber to a filter device. During operation of the coffee maker, the actuation of the pump is controlled by a control device. In U.S. Pat. No. 6,000,317, it is noted that if the entire content of the reservoir is to be brewed, a sensor which is responsive to the absence of water may be applied, wherein a signal of this sensor leads to a termination of the operation of the pump. Furthermore, in U.S. Pat. No. 6,000,317, it is noted that in case it is desired to use the coffee maker for preparing coffee by using only a portion of water from the reservoir, the coffee maker may be provided with a control selector for inputting-to the control device the desired quantity of coffee to be brewed. In such case, a flow detector may be provided in a flow path between the reservoir and the filter device, to measure the total flow of water during the process of preparing the coffee. The control device will deactivate the pump when a desired flow has taken place. Alternatively, it is possible that the operating time of the pump is controlled depending upon a desired quantity of coffee to be brewed.

SUMMARY OF THE INVENTION

On the one hand, the above-described known methods of controlling a quantity of water that is used in a process of preparing coffee may yield good results, but, on the other hand, these methods require an application of rather expensive components in a coffee maker. Therefore, it is an objective of the present invention to provide a method of controlling a quantity of water to be used for the purpose of obtaining a quantity of hot liquid, which offers a possibility of avoiding the application of expensive components. The objective is achieved by a method which comprises the following steps:

heating water in a boiler having an interior space for containing water, and heating means for supplying heat to the water;

forcing the hot water to flow out of the boiler, through a water outlet of the boiler, and, at the same time, forcing cold water to flow into the boiler, through a water inlet of the boiler;

measuring a temperature of the water in the water flow thus obtained, at a predetermined position with respect to the water inlet of the boiler; and causing the water flow to be stopped when the temperature of the water appears to be below a predetermined value.

According to the present invention, a quantity of hot water flowing from the boiler is limited on the basis of a measurement of a temperature of the water, wherein the measurement is performed at a predetermined position with respect to a water inlet of the boiler. The measurement may be performed by using any suitable temperature sensing device, for example a so-called negative temperature coefficient thermistor, which is a resistor of which the resistance decreases with increasing temperature.

The method according to the present invention is applicable in case cold water enters the boiler through the water inlet of the boiler when hot water is pumped out of the boiler. In such case, due to the fact that a density of cold water is higher than a density of hot water, there is a separation layer which separates the cold water from the hot water. When the separation layer reaches the position where the temperature of the water is measured, a sudden decrease of the temperature is detected, wherein the temperature changes from a value above a predetermined value to below this predetermined value. At that instant, or a predetermined period of time later, the water flow is stopped, and the quantity of hot water that is pumped out of the boiler corresponds to the quantity of cold water that has entered the boiler during the pumping action. This quantity has a consistent value, provided that the measurements of the temperature of the water are performed at the same level with respect to the water inlet of the boiler. In view of the fact that there is a considerable difference between the temperature of the cold water and the temperature of the hot water, which may even be larger than 70° C., it is possible to accurately determine the moment at which the water flow needs to be stopped.

For the purpose of carrying out the method according to the present invention, there is no need for applying expensive components. Advantageously, the method is carried out by applying a pump for the purpose of forcing the water to flow, which pump is energized by an energizing circuit, and applying a combination of a switching device and a sensing member for the purpose of sensing the temperature of the water and causing an interruption of the energizing circuit when the temperature of the water appears to be below a set point of the switching device, at that instant or a predetermined period of time later. For example, the combination of the switching device and the sensing member may be a commercial grade mechanical thermostat, which is a relatively cheap component. In any case, there is no need for the application of a flow meter or means for controlling the duration of the operation of the pump.

Preferably, in order to guarantee that the flow of cold water entering the boiler through the water inlet when hot water is pumped out of the boiler is a lamina flow, flow distributing means are applied, which may be any suitable flow distributing means known per se.

In practice, the method according to the present invention will be carried out by a device such as a beverage maker. According to the present invention, a device is provided, which is adapted to control a quantity of water to be used for the purpose of obtaining a quantity of hot liquid by applying the method as described in the foregoing and which comprises the following components:
  a boiler having an interior space for containing water, and heating means for supplying heat to the water;
  a pump for pumping water in and out of the boiler;
  an energizing circuit having a pumping circuit for energizing the pump; and
  a combination of a switching device and a sensing member, wherein the switching device is arranged in the pumping circuit, and is capable of either interrupting or closing the pumping circuit, and wherein the sensing member is capable of sensing a temperature of water that is present inside the boiler;
wherein the switching device is adapted to interrupting the pumping circuit in case the temperature of the water is below a predetermined value, and wherein the sensing member is positioned at a predetermined distance with respect to a water inlet of the boiler.

In this device, there is no need for a sophisticated controlling device for the purpose of accurately controlling the quantity of water to be used for the purpose of obtaining a quantity of hot liquid. Instead, all that is needed is an energizing circuit for energizing the pump of the device and a combination of a switching device and a sensing member for interrupting the supply of energy to the pump when the temperature of the water drops below a predetermined value. By applying such combination of a switching device and a sensing member, the operation of the pump is automatically terminated when the separation layer between the cold water and the hot water reaches the point where the temperature is measured.

The sensing member is positioned at a predetermined distance with respect to the water inlet of the boiler, and the quantity of the water that is measured out by applying the switching device for the purpose of terminating the operation of the pump is directly related to the position of the sensing member with respect to the water inlet of the boiler. As the quantity of the hot water that is pumped out of the boiler during operation of the pump is equal to the quantity of the cold water that is pumped into the boiler, it is true that the larger the distance of the sensing member with respect to the water inlet of the boiler, the larger the quantity of cold water that is pumped into the boiler, and the larger the quantity of hot water that is pumped out of the boiler.

It is noted that the combination of the switching device and the sensing member may be a relatively cheap mechanical thermostat or any other commercially available suitable component.

In a preferred embodiment of the device according to the present invention, a second combination of a switching device and a sensing member is used for the purpose of terminating the operation of the heating means of the boiler when the temperature of the water appears to be above a predetermined value. In such embodiment, besides the pumping circuit, the energizing circuit comprises a heating circuit, wherein the second switching device is arranged in this heating circuit. In a practical embodiment, the second sensing member may be arranged such as to detect the temperature of the water in an indirect fashion, namely by detecting a temperature of the heating means of the boiler.

Like the sensing member associated with the switching device arranged in the pumping circuit, the sensing member associated with the switching device arranged in the heating circuit is arranged at a predetermined distance with respect to the water inlet of the boiler. Preferably, the distance between the sensing member associated with the switching device arranged in the pumping circuit and the water inlet of the boiler is larger than the distance between the sensing member associated with the switching device arranged in the heating circuit and the water inlet of the boiler. In this way, it is achieved that during a pumping action, the separation layer between the cold water and the hot water reaches the sensing member associated with the switching device arranged in the heating circuit first, so that it is guaranteed that the cold water reaches this sensing member, and that a control of the heating means for a contiguous process of supplying a hot liquid is based on the presence of cold water in the boiler.

Like the combination of the switching device and the sensing member arranged in the pumping circuit, the combination of the switching device and the sensing member arranged in the heating circuit may be a mechanical thermostat or another relatively cheap component. The switching device may be only manually settable to a condition for closing the heating circuit, so that a user of the device according to the present invention determines the initiation of a process of heating the water and displacing a quantity of water through the boiler, wherein hot water is pumped out of the boiler, and wherein cold water is pumped into the boiler. It is also possible that the energizing circuit comprises a switching device for closing either the pumping circuit or the heating circuit. In such case, after a process of heating the water has taken place, a pumping action is not initiated before a user indicates that such action may be initiated by changing the position of the switching device such as to close the pumping circuit.

In a particular embodiment, the device according to the present invention comprises a push button switch for temporarily closing the pumping circuit, and a relay which is arranged in the pumping circuit. The relay may be an electromechanical relay, for example. In this embodiment of the device, a user determines the moment at which a pumping action is initiated, namely by operating the push button switch. The arrangement of the relay in the energizing circuit of the device may be such that a coil of the relay is self-energized, so that the pump is kept running even when the user releases the push button of the push button switch. When the pumping action is terminated, the supply of current to the coil of the relay is interrupted. In this embodiment, the heating circuit may be automatically closed when the temperature of the water inside the boiler is lower than a predetermined level, and a process of energizing the heating means of the boiler may be automatically resumed, without intervention of the user.

Preferably, the device according to the present invention comprises a flow distributor which is fitted in the water inlet of the boiler, and which is adapted to contribute to a realization of lamina flow of the water during a pumping action of the pump. In this way, a high accuracy of the process of controlling the quantity of the hot water that is forced to flow out of the boiler is ensured, as a well-defined separation layer between the cold water and the hot water is obtained.

It is noted that the present invention is applicable in a device which is suitable for dispensing different predetermined quantities of liquid. For example, a device may be provided with two pumping circuits, wherein the sensing members associated with the switching devices of these pumping circuits are positioned at different predetermined distances with respect to the water inlet of the boiler of the device. During operation of the device, depending on input provided by a user, only one of the pumping circuits is closed, and the sensing member associated with only one of the switching devices is used in a process of sensing a temperature of the water inside the boiler and causing the associated switching device to terminate a pumping action when the temperature appears to have fallen below a predetermined minimum. In this respect, it is noted that the device may comprise a manually operable switching device for closing either of the pumping circuits, for example.

The above-described and other aspects of the present invention will be apparent from and elucidated with reference to four embodiments of a device according to the present invention as described hereinafter.

BRIEF DESCRIPTION OF THE DRAWINGS

The present invention will now be explained in greater detail with reference to the figures, in which equal or similar parts are indicated by the same reference signs, and in which.

DETAILED DESCRIPTION OF EMBODIMENTS

Figure 1:
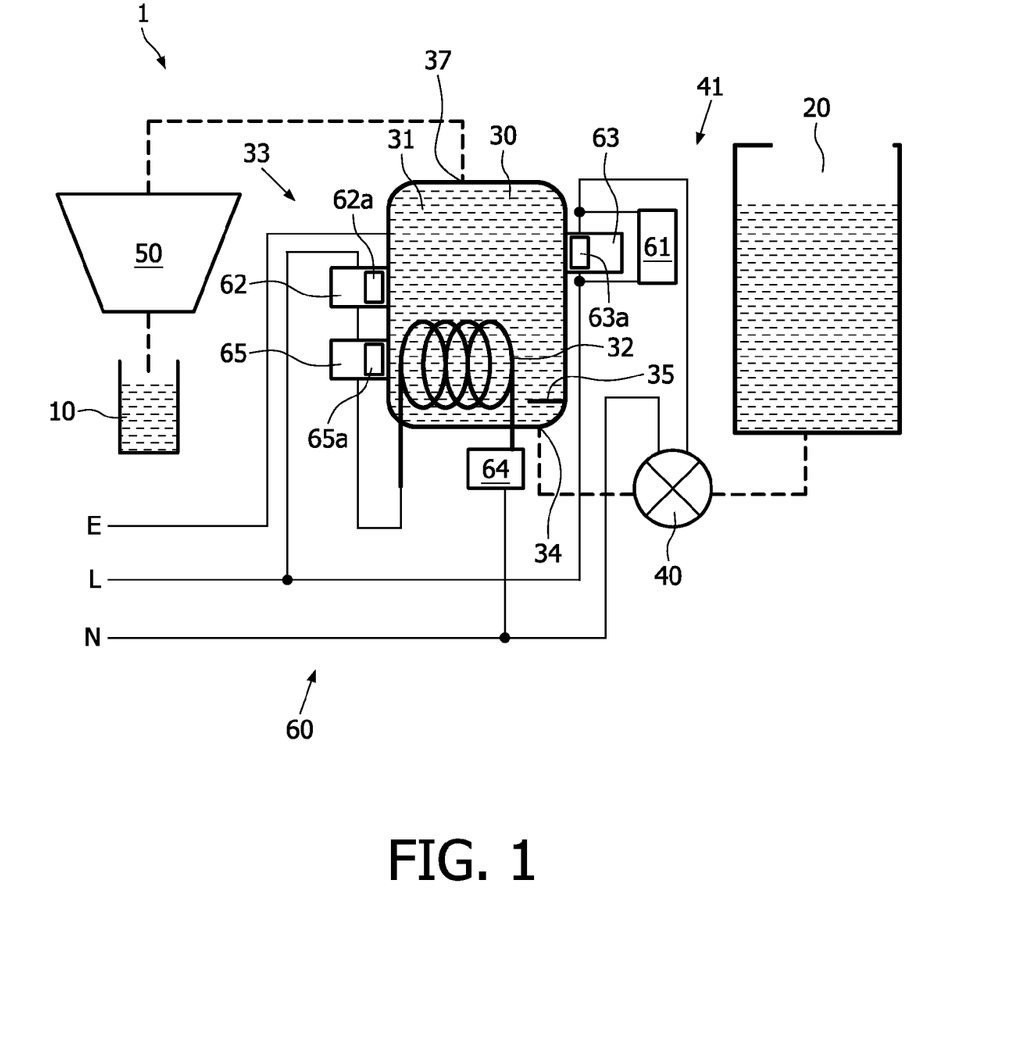
FIG. 1 diagrammatically shows components and an electric circuit of a beverage maker according to a first preferred embodiment of the present invention.

FIG. 1 diagrammatically shows components 20, 30, 40, 50 and an electric circuit 60 of a beverage maker 1 according to a first preferred embodiment of the present invention, which will hereinafter be referred to as first beverage maker 1. This beverage maker 1 is suitable for making coffee on the basis of hot water and a coffee pad (not shown) filled with ground coffee beans, which does not alter the fact that the beverage maker 1 may just as well be suitable for preparing other hot drinks. Besides the components 20, 30, 40, 50 and the electric circuit 60 of the first beverage maker 1, FIG. 1 also shows a container 10 such as a cup for receiving the coffee from the beverage maker 1.

The first beverage maker 1 comprises a water tank 20 for containing water, a boiler 30 having an interior space 31 for containing water and a heating element 32 for supplying heat to the water, an electric pump 40 for pumping water from the water tank 20 to the boiler 30, and a sealable brew chamber 50 for receiving and accommodating a coffee pad.

When a user desires to make a quantity of coffee by using the first beverage maker 1, the user inserts a coffee pad into the brew chamber 50, and activates the beverage maker 1. In case the boiler 30 appears to be empty, the user activates the pump 40 first, in order to fill the boiler 30 by pumping water from the water tank 20 to the boiler 30. As a first step in a process of making coffee, the water inside the boiler 30 is heated by means of the heating element 32. When the temperature of the water has reached a predetermined level, the pump 40 is activated automatically, so that cold water is transported from the water tank 20 to the boiler 30, and hot water is transported from the boiler 30 to the brew chamber 50. In the process, as a second step in a process of making coffee, inside the brew chamber 50, an interaction between the hot water and the quantity of ground coffee beans that is contained by the coffee pad takes place. As a result, hot coffee is obtained, which flows from the brew chamber 50 to the cup 10. The quantity of the water that is used in the process of making coffee is adapted to the quantity of ground coffee beans that is used. In FIG. 1, a path of the water through the first beverage maker 1 is diagrammatically depicted as a dotted line.

The electric circuit 60 of the first beverage maker 1 comprises several components, which will be identified in the following description of the way in which the above-described operation of the beverage maker 1 is controlled.

The electric circuit 60 comprises a power switch 61, which is activated by the user when the boiler 30 needs to be filled with water before the heating element 32 of the boiler 30 is activated. The power switch 61 is adapted to opening or closing a pumping circuit 41 which is part of the electric circuit 60, and which serves for supplying electric power to the pump 40.

Furthermore, the electric circuit 60 comprises a thermal limiter 62, which is only manually settable to a closed condition, and which is associated with a sensing member 62a for sensing a temperature of the water inside the boiler 30. The thermal limiter 62 is adapted to opening or closing a heating circuit 33 which is part of the electric circuit 60, and which serves for supplying electric power to the heating element 32 of the boiler 30. When the user has closed the thermal limiter 62, the water inside the boiler 30 is heated until the temperature of the water has reached a level which corresponds to a set point of the thermal limiter 62. At that moment, the thermal limiter 62 switches automatically to an opened position, wherein the heating circuit 33 is interrupted, and the power supply to the heating element 32 stops.

Besides the power switch 61 and the thermal limiter 62 as described in the foregoing, the electric circuit 60 of the first beverage maker 1 comprises a normally opened thermostat 63, i.e. a thermostat 63 that switches to a closed position when a temperature that is detected by a sensing member 63a of the thermostat 63 exceeds a set point of the thermostat 63. The normally opened thermostat 63 is arranged in the pumping circuit 41, and the sensing member 63a of the thermostat 63 is arranged at a position in the boiler 30, which position is further away from a water inlet 34 of the boiler 30 than the position at which the sensing member 62a associated with the thermal limiter 62 is arranged.

When the temperature of the water inside the boiler 30 has reached a set point of the normally opened thermostat 63, the thermostat 63 switches to a closed position, as a result of which the pumping circuit 41 is closed and the pump 40 is activated. Under the influence of the pump 40, water is displaced through the first beverage maker 1, wherein cold water is transported from the water tank 20 to the boiler 30, and wherein hot water is transported from the boiler 30 to the brew chamber 50.

At the water inlet 34 of the boiler 30, a flow distributor 35 is arranged, under the influence of which a lamina flow is produced during a pumping action. In this way, it is ensured that a well-defined separation layer is obtained, which separates the cold water from the hot water. The normally opened thermostat 63 switches back to an opened position when a front of the cold water reaches the sensing member 63a of the thermostat 63, and the detected temperature suddenly falls below a set point of the thermostat 63. Due to this, the operation of the pump 40 is stopped.

It follows from the preceding paragraph that the time during which the pump 40 is operated for the purpose of pumping cold water into the boiler 30 and hot water out of the boiler 30 is determined by the position of the sensing member 63a of the normally opened thermostat 63 with respect to the water inlet 34 of the boiler 30. Consequently, the quantity of the water that is displaced during a pumping action is determined by the position of the sensing member 63a of the normally opened thermostat 63 with respect to the water inlet 34 of the boiler 30. Therefore, the quantity of coffee that is made during operation of the first beverage maker 1 is accurately controlled on the basis of the application of the normally opened thermostat 63.

The position of the sensing member 62a associated with the thermal limiter 62 and the set point of the thermal limiter 62 are chosen such that the opened position of the thermal limiter 62 is obtained before the cold water reaches the sensing member 62a. In this way, a situation in which the closed position of the thermal limiter 62 is maintained is avoided. The position of the sensing member 63a of the normally opened thermostat 63 and the set point of the thermostat 63 are chosen such that the closed position of the thermostat 63 is obtained before or shortly after the thermal limiter 62 switches to the opened position.

In order to ensure safety during operation of the first beverage maker 1, the electric circuit 60 comprises a thermal fuse 64 which is connected in series with the heating element 32 of the boiler 30. Furthermore, the electric circuit 60 comprises a normally closed thermostat 65, i.e. a thermostat 65 that switches to an opened position when a temperature that is detected by a sensing member 65a of the thermostat 65 exceeds a set point of the thermostat 65. The normally closed thermostat 65 is arranged in the heating circuit 33, and the sensing member 65a of the thermostat 65 is arranged such as to detect the temperature of the heating element 32 of the boiler 30. As soon as the temperature of the heating element 32 exceeds a set point of the normally closed thermostat 65, the thermostat 65 switches to an opened position, and the power supply to the heating element 32 is interrupted. By means of the normally closed thermostat 65, a situation in which the temperature of the heating element 32 gets dangerously high, which may occur in case there is no water in the boiler 30, is avoided.

In case the water tank 20 is empty during operation of the pump 40, no flow of water to the brew chamber 50 is obtained, so that the supply of freshly brewed hot coffee from the beverage maker 1 is stopped. Furthermore, the sound that is generated by the pump 40 during operation will be louder than usual. On the basis of these two effects of an empty water tank 20, the user is notified of the situation. Consequently, there is no need for the application of an additional sensor or the like for checking the water level in the water tank 20 and warning the user when the water tank 20 is empty. In this way, the electric circuit 60 is kept simple and costs are kept at a low level. Although it is preferred to avoid the application of an additional sensor or the like, such application is not excluded within the scope of the present invention.

It follows from the above description of the first beverage maker 1 that all that a user needs to do for the purpose of obtaining coffee is putting the thermal limiter 62 to the closed position. From that moment on, the process of making coffee and supplying the coffee to the cup 10 is performed automatically. In the process, the thermal limiter 62 switches back to the opened position when the temperature of the water inside the boiler 30 has reached a predetermined level, the normally opened thermostat 63 switches to a closed position when the temperature of the water inside the boiler 30 has reached a predetermined level, and the normally opened thermostat 63 switches back to the opened position when the temperature of the water inside the boiler 30 falls below a predetermined level. The latter takes place when a separation layer between cold water and hot water, which moves through the boiler 30 during a pumping action, reaches the sensing member 63a of the normally opened thermostat 63.

Figure 2:
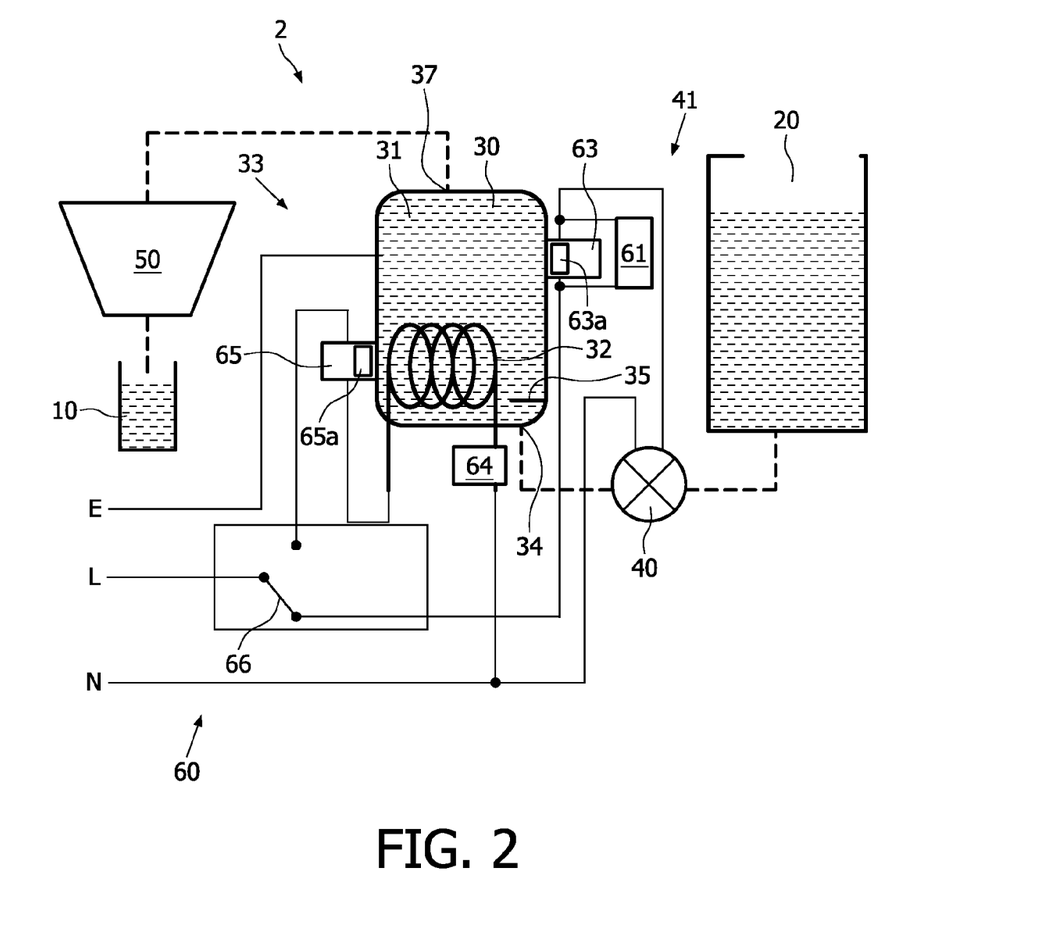
FIG. 2 diagrammatically shows components and an electric circuit of a beverage maker according to a second preferred embodiment of the present invention.

FIG. 2 diagrammatically shows components 20, 30, 40, 50 and an electric circuit 60 of a beverage maker 2 according to a second preferred embodiment of the present invention, which will hereinafter be referred to as second beverage maker 2.

The second beverage maker 2 resembles the first beverage maker 1 to a large extent. In particular, the electric circuit 60 of the second beverage maker 2 has a heating circuit 33 and a pumping circuit 41, and comprises the power switch 61, the normally opened thermostat 63, the thermal fuse 64 and the normally closed thermostat 65 which have been described in relation to the first beverage maker 1. However, the electric circuit 60 of the second beverage maker 2 does not comprise the thermal limiter 62. Instead, the second beverage maker 2 comprises a power switch 66 for closing either the heating circuit 33 or the pumping circuit 41. The power switch 66 may be a single-pole double-throws power switch, like the switch 66 as diagrammatically shown in FIG. 2. The switch 66 is switchable between a heating position, which is a position for closing the heating circuit 33, and a combined pumping/off position, which is a position for closing the pumping circuit 41. Within the scope of the present invention, it is also possible that another multi-pole switch is applied for another user interface. For example, the power switch 66 may comprise a 3-position slide switch in order to have an off position, a heating position and a pumping position.

In the second beverage maker 2, the normally closed thermostat 65 is used for detecting a temperature of the heating element 32 of the boiler 30, wherein this temperature serves as a measure of the temperature of the water inside the boiler 30. When the user of the second beverage maker 2 switches the power switch 66 to the heating position, the heating element 32 of the boiler 30 is activated, and the water that is present inside the boiler 30 is heated. The heating process is continued until the temperature of the heating element 32 exceeds a set point of the normally closed thermostat 65.

The second beverage maker 2 may comprise any suitable means for warning the user that the temperature of the water has reached a desired level. For example, the second beverage maker 2 may comprise a lamp which is activated as soon as the normally closed thermostat 65 switches to the opened position.

The set point of the normally opened thermostat 63 is slightly lower than the set point of the normally closed thermostat 65. In this way, it is ensured that the normally opened thermostat 63 always switches to the closed position before the normally closed thermostat 65 switches to the opened position. When the user of the second beverage maker 2 switches the power switch 66 from the heating position to the pumping position, the pumping circuit 41 is closed, and the hot water is pumped from the boiler 30 to the brew chamber 50, and the hot coffee that is obtained in the brew chamber 50 is pumped from the brew chamber 50 to the cup 10. In the process, the boiler 30 is filled with cold water that is supplied by the water tank 20. When the separation layer between the hot water and the cold water is at the same level as the sensing member 63a of the normally opened thermostat 63, the normally opened thermostat 63 switches back to the opened position, and the pumping action is terminated. At that point, the second beverage maker 2 is at off condition.

In case the user puts the power switch 66 to the pumping position before the normally opened thermostat 63 switches to the closed position, the second beverage maker 2 will be at the off condition.

It follows from the above description of the second beverage maker 2 that all that a user needs to do for the purpose of obtaining coffee is putting the power switch 66 to the heating position first, and putting the power switch 66 to the pumping position later on, when a signal indicating that the temperature of the water has reached a correct level has been received. In the process, the normally closed thermostat 65 switches to the opened position when the temperature of the heating element 32 of the boiler 30 has reached a predetermined level, the normally opened thermostat 63 switches to a closed position when the temperature of the water inside the boiler 30 has reached a predetermined level, and the normally opened thermostat 63 switches back to the opened position when the temperature of the water inside the boiler 30 falls below a predetermined level. The latter takes place when a separation layer between cold water and hot water, which moves through the boiler 30 during a pumping action, reaches the sensing member 63a of the normally opened thermostat 63.

Figure 3:
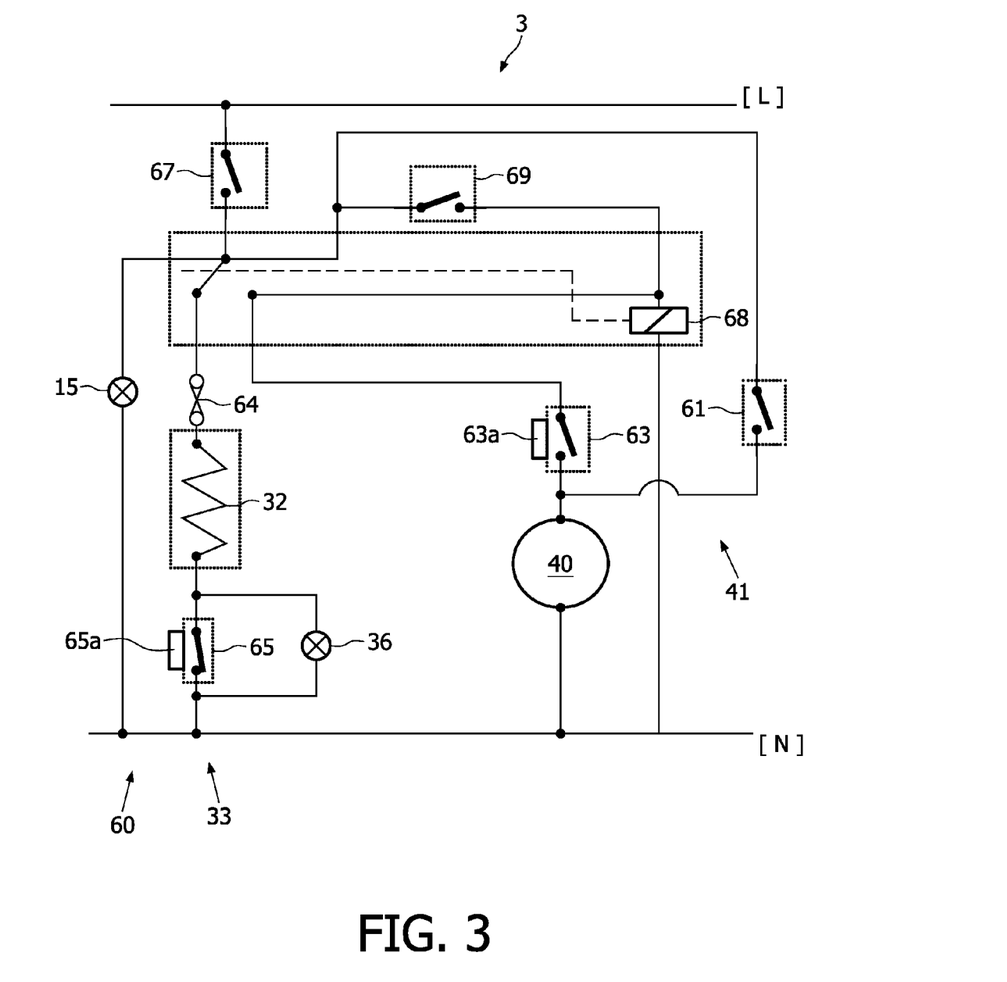
FIG. 3 diagrammatically shows components and an electric circuit of a beverage maker according to a third preferred embodiment of the present invention.

FIG. 3 shows components 15, 32, 36, 40 and an electric circuit 60 of a beverage maker 3 according to a third preferred embodiment of the present invention, which will hereinafter be referred to as third beverage maker 3. Like the first beverage maker 1 and the second beverage maker 2, the third beverage maker 3 comprises a water tank 20, a boiler 30 having an interior space 31 and a heating element 32, an electric pump 40, and a sealable brew chamber 50. In FIG. 3, only the heating element 32 of the boiler 30 and the pump 40 are shown.

When a user desires to make a quantity of coffee by using the third beverage maker 3, the user inserts a coffee pad into the brew chamber 50, and activates the beverage maker 3. In case the boiler 30 appears to be empty, the user activates the pump 40 first, in order to fill the boiler 30 by pumping water from the water tank 20 to the boiler 30. As a first step in a process of making coffee, the water inside the boiler 30 is heated by means of the heating element 32. When the temperature of the water has reached a predetermined level, a warning signal is provided to the user. When the user reacts to this signal by activating the pump 40, cold water is transported from the water tank 20 to the boiler 30, and hot water is transported from the boiler 30 to the brew chamber 50. In the process, as a second step in a process of making coffee, inside the brew chamber 50, an interaction between the hot water and the quantity of ground coffee beans that is contained by the coffee pad takes place. As a result, hot coffee is obtained. The quantity of the water that is used in the process of making coffee is adapted to the quantity of ground coffee beans that is used.

When the pumping action has ended, a process of heating the water inside the boiler 30 is automatically resumed. In case the user tries to activate the pump 40 before the heating process has ended, the pump 40 will not start, and the heating process will be continued.

The way in which the third beverage maker 3 is operated will be further elucidated on the basis of the following description of the electric circuit 60 of the beverage maker 3.

Like the electric circuits 60 of the first beverage maker 1 and the second beverage maker 2, the electric circuit 60 of the third beverage maker 3 has a heating circuit 33 and a pumping circuit 41, and comprises the power switch 61 for closing the pumping circuit 41 when the boiler 30 is empty and needs to be filled with water from the water tank 20, the normally opened thermostat 63 for closing the pumping circuit 41 when the water inside the boiler 30 has been heated to a predetermined temperature, the thermal fuse 64 for preventing the boiler 30 from getting too hot, and the normally closed thermostat 65 for opening the heating circuit 33 when the temperature of the heating element 32 of the boiler 30 exceeds a predetermined level.

Furthermore, the electric circuit 60 of the third beverage maker 3 comprises a power switch 67 which serves as a main switch of the beverage maker 3, and a lamp 15, which is connected in series with the main switch 67, and which serves as an indicator of the on/off status of the beverage maker 3.

In the heating circuit 33, another lamp 36 is arranged, which is connected in parallel to the normally closed thermostat 65, and which is activated when the normally closed thermostat 65 is put to an opened position. As the latter takes place when the temperature of the water inside the boiler 30 has reached a predetermined level, the lamp 36 serves to indicate to the user of the beverage maker 3 whether a pumping action may be started, or not.

In the pumping circuit 41, both a relay 68 and a push button switch 69 for triggering the pump 40 and the relay 68 are arranged. In this example, the relay 68 is a high current electromechanical relay having a magnetic coil for establishing electric contact.

When the user of the third beverage maker 3 puts the main switch 67 to a closed position, the lamp 15 is activated, and the heating circuit 33 is closed. The heating element 32 of the boiler 30 heats the content of the boiler 30, until the temperature of the heating element 32 exceeds a set point of the normally closed thermostat 65. At that moment, the lamp 36 for indicating that the process of heating the water has been completed is activated. If necessary, the normally closed thermostat 65 is alternately put to an opened position and a closed position in order to maintain the temperature of the water inside the boiler 30 at a desired level.

The normally opened thermostat 63 switches to a closed position when the temperature of the water inside the boiler 30 exceeds a set point of this thermostat 63. The position of the sensing member 63a of the normally opened thermostat 63 and the set point of the thermostat 63 are chosen such that the closed position of the thermostat 63 is obtained before or shortly after the normally closed thermostat 65 switches to the opened position.

When the user of the third beverage maker 3 operates the push button switch 69, the pumping circuit 41 is closed for a short moment. The relay 68 is used to provide a mechanical memory function, and the coil of the relay 68 is self-energized through a connection which is depicted by a dashed line in FIG. 3, so that the pump 40 is kept running, even when the user has released the push button of the push button switch 69 and this switch is in the opened position again.

The pumping action stops when the temperature of the water inside the boiler 30 is lower than a set point of the normally opened thermostat 63. This is the case when a front of the cold water that pushes the hot water out of the boiler 30, as it were, reaches the level of the sensing member 63a of the normally opened thermostat 63. When the normally opened thermostat 63 switches back to the opened position, the supply of current to the coil of the relay 68 is interrupted. Furthermore, the heating element 32 of the boiler 30 is activated to heat the water inside the boiler 30 again, unless the user puts the main switch 67 to the opened position.

In all beverage makers 1, 2, 3 as described and shown in the foregoing, the pumping action is dependent on the position of the normally opened thermostat 63, in such a way that a pumping action can only take place when the thermostat 63 is in the closed position. The thermostat 63 closes when the temperature of the water inside the boiler 30 exceeds a set point of this thermostat 63. At that moment, a pumping action is started, during which hot water is displaced from the boiler 30 to the brewing chamber 50, and cold water is displaced from the water tank 20 to the boiler 30. Under the influence of a flow distributor 35 which is positioned at the water inlet 34 of the boiler 30, the flow of water is a lamina flow, and a well-defined separation layer between the cold water and the hot water is obtained. Every time a pumping action is performed, this separation layer has practically the same characteristics. When the separation layer reaches a level in the boiler 30 at which the sensing member 63a of the normally opened thermostat 63 is present, the sensing member 63a is suddenly cooled down, wherein the temperature drops below a set point, and the thermostat 63 opens.

At the moment the normally opened thermostat 63 switches back to the opened position, the pumping action stops, and a quantity of hot water that has been forced to flow out of the boiler 30 through a water outlet 37 of the boiler 30 equals a quantity of cold water that has entered the boiler 30 through the water inlet 34 of the boiler 30. The quantity of the water that has been displaced through the boiler 30 is directly related to the position of the sensing member 63a of the normally opened thermostat 63 with respect to the water inlet 34 of the boiler 30. Therefore, the quantity of water that is used in a process of making coffee is accurately controlled on the basis of the functioning of the normally opened thermostat 63.

It has appeared from tests which have been performed in respect of the present invention that satisfying results can be obtained when a normally opened thermostat 63 having a set point of 78±3° C. for switching to the closed position and a hysteresis of 10° C. is applied. When it is required to increase the quantity of water to be displaced under the influence of a pumping action, the duration of the pumping action may be prolonged by applying a thermostat 63 having a larger hysteresis, wherein the hysteresis may be 20° C., for example.

In the foregoing, a beverage maker 1, 2, 3 which comprises a boiler 30 having heating means 32 for heating cold water and a normally opened thermostat 63 is disclosed. The thermostat 63 has a sensing member 63a for sensing a temperature of the water inside the boiler 30, wherein the sensing member 63a is located at a certain distance with respect to a water inlet 34 of the boiler 30.

At a certain moment in a process of heating the water, the temperature of the water exceeds a set point of the thermostat 63, and the thermostat 63 closes. As a result, a pumping action is started, wherein hot water is forced to flow out of the boiler 30, through a water outlet 37 of the boiler 30, and wherein cold water is forced to flow into the boiler 30, through the water inlet 34 of the boiler 30. When a front of the cold water reaches the sensing member 63a of the thermostat 63, the thermostat 63 is triggered to switch back to an opened position, and the pumping action is terminated. On the basis of the action of the thermostat 63, the quantity of hot water that is used for the purpose of making a beverage is accurately controlled.

Figure 4:
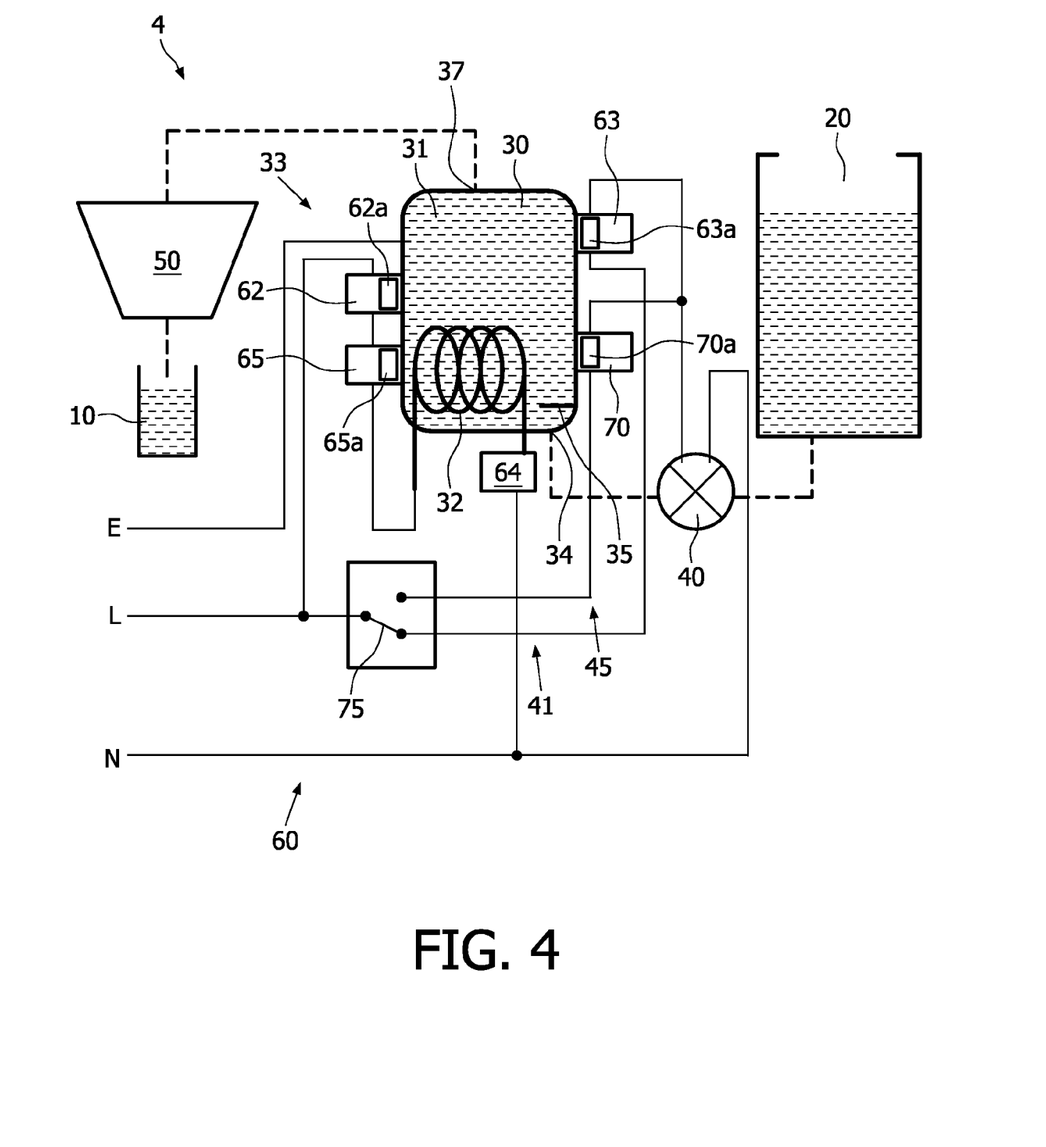
FIG. 4 diagrammatically shows components and an electric circuit of a beverage maker according to a fourth preferred embodiment of the present invention.

FIG. 4 diagrammatically shows components 20, 30, 40, 50 and an electric circuit 60 of a beverage maker 4 according to a fourth preferred embodiment of the present invention, which will hereinafter be referred to as fourth beverage maker 4.

The fourth beverage maker 4 resembles the first beverage maker 1 to a large extent. However, a main difference between the fourth beverage maker 4 and the first beverage maker 1 resides in the fact that the fourth beverage maker 4 offers a user of the beverage maker 4 a choice between two predetermined quantities of beverage, wherein the user can decide whether to have a relatively small quantity of beverage or a relatively large quantity of beverage. To this end, the fourth beverage maker 4 comprises a two pumping circuits 41, 45, which are both part of the electric circuit 60 of the beverage maker 4, and which are configured in parallel, and a manually operable selection switch 75 for closing either of the pumping circuits 41, 45.

Each of the pumping circuits 41, 45 comprises a normally opened thermostat 63, 70 having a sensing member 63a, 70a which is arranged such as to detect a temperature of the water that is present inside the boiler 30, wherein the sensing members 63a, 70a of the thermostats 63, 70 are arranged at different positions with respect to the water inlet 34 of the boiler 30. The sensing member 63a of the thermostat 63 of a first pumping circuit 41 is positioned further away from the water inlet 34 of the boiler 30 than the sensing member 70a of the thermostat 70 of a second pumping circuit 45. As the moment at which a pumping action is terminated is related to the moment at which a separation layer between hot water and cold water reaches the level of a sensing member 63a, 70a, it is clear that when the first pumping circuit 41 is used for energizing the pump 40, the quantity of water that is forced to flow out of the boiler 30 is larger than when the second pumping circuit 45 is used.

Thus, in the fourth beverage maker 4, the user is enabled to choose between two predetermined quantities of beverage. Apart from that, the fourth beverage maker 4 functions in the same manner as the first beverage maker 1. It is noted that like the first beverage maker 1, the fourth beverage maker 4 may also be provided with a power switch 61 which is arranged in parallel to one of the normally opened thermostats 63, 70, for the purpose of allowing the user of the beverage maker 4 to fill the boiler 30 with water whenever it appears to be necessary and/or desirable to do so.

It will be clear to a person skilled in the art that the scope of the present invention is not limited to the examples discussed in the foregoing, but that several amendments and modifications thereof are possible without deviating from the scope of the present invention as defined in the attached claims. While the present invention has been illustrated and described in detail in the figures and the description, such illustration and description are to be considered illustrative or exemplary only, and not restrictive. The present invention is not limited to the disclosed embodiments.

The present invention is applicable in any coffee maker, including coffee makers which are adapted to make coffee in another manner than by using at least one coffee pad. Furthermore, it should be understood that although the beverage makers 1, 2, 3, 4 as described and shown in the foregoing are described as being suitable for making coffee, the present invention is applicable in any beverage maker which is adapted to make a hot beverage, wherein such beverage does not necessarily need to be coffee. The present invention is even applicable in a device which is adapted to dispense quantities of hot water, i.e. an electric water kettle or the like, wherein the device is only adapted to perform a process of heating the water, and not to perform a process of conducting the water through a quantity of extractable material in order to prepare a beverage.

Other variations to the disclosed embodiments can be understood and effected by a person skilled in the art in practicing the claimed invention, from a study of the figures, the description and the attached claims. In the claims, the word "comprising" does not exclude other steps or elements, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope of the present invention.

The invention claimed is:

1. A device which is adapted to control a quantity of water to be used for the purpose of obtaining a quantity of hot liquid, the device comprising:
   a boiler having an interior space for containing water;
   a heater configured to supply heat to the water;
   a pump configured to pump water in and out of the boiler;
   an energizing circuit having a pumping circuit for energizing the pump:
   a combination of a switching device and a sensing member, wherein the switching device is arranged in the pumping circuit, and is capable of either interrupting or closing the pumping circuit, and wherein the sensing member is capable of sensing a temperature of water that is present inside the boiler; and
   a flow distributor is fitted in the water inlet of the boiler, and wherein the flow distributor is configured to contribute to a realization of lamina flow of the water during a pumping action of the pump;
   wherein the switching device is configured to interrupt the pumping circuit in case the temperature of the water is below a predetermined value, and wherein the sensing member is positioned at a predetermined distance with respect to a water inlet of the boiler.

2. The device according to claim 1, wherein the energizing circuit further has a heating circuit for energizing the heater of the boiler; and wherein another switching device is arranged in the heating circuit, which is capable of either interrupting or closing the heating circuit;
   wherein the switching device is associated with a sensing member for sensing a temperature of water that is present inside the boiler, and wherein the switching device is adapted to interrupting the heating circuit in case the temperature of the water is above a predetermined value, wherein the sensing member is positioned at a predetermined distance with respect to the water inlet of the boiler.

3. The device according to claim 2, wherein a distance between the sensing member associated with the switching device arranged in the pumping circuit and the water inlet of the boiler is larger than a distance between the sensing member associated with the switching device arranged in the heating circuit and the water inlet of the boiler.

4. The device according to claim 2, wherein the switching device arranged in the heating circuit is only manually settable to a condition for closing the heating circuit.

5. The device according to claim 2, wherein the energizing circuit further comprises a switching device for closing either the heating circuit or the pumping circuit.

6. The device according to claim 1, further comprising a push button switch for temporarily closing the pumping circuit, and a relay which is arranged in the pumping circuit.

7. A device which is adapted to control a quantity of water to be used for the purpose of obtaining a quantity of hot liquid, the device comprising:
   a boiler having an interior space for containing water;
   a heater configured to supply heat to the water;
   a pump configured to pump water in and out of the boiler;
   an energizing circuit having a pumping circuit for energizing the pump; and
   a combination of a switching device and a sensing member, wherein the switching device is arranged in the pumping circuit, and is capable of either interrupting or closing the pumping circuit, and wherein the sensing member is capable of sensing a temperature of water that is present inside the boiler, wherein the switching device is configured to interrupt the pumping circuit in case the temperature of the water is below a predetermined value, and wherein the sensing member is positioned at a predetermined distance with respect to a water inlet of the boiler; and
   a second pumping circuit for energizing the pump, which is configured in parallel to the first pumping circuit; a manually operable switching device for closing either of the pumping circuits; and a second switching device which is arranged in the second pumping circuit, which is capable of either interrupting or closing the second pumping circuit, and which, like the first switching device, is associated with a sensing member for sensing a temperature of water that is present inside the boiler, wherein the second switching device is adapted to interrupting the second pumping circuit in case the temperature of the water is below a predetermined value, and wherein the sensing member associated with the second switching device is positioned at a predetermined distance with respect to the water inlet of the boiler, which predetermined distance is different from the predetermined distance at which the sensing member associated with the first switching device is positioned with respect to the water inlet of the boiler.

8. A method for controlling a quantity of water to be used for the purpose of obtaining a quantity of hot liquid, comprising the acts of:
   heating water in a boiler having an interior space for containing water, and heating means for supplying heat to the water;
   forcing the hot water to flow out of the boiler, through a water outlet of the boiler, and, at the same time, forcing cold water to flow into the boiler, through a water inlet of the boiler;

measuring a temperature of the water in the water flow thus obtained, at a predetermined position with respect to the water inlet of the boiler; and causing the water flow to be stopped when the temperature of the water appears to be below a predetermined value, wherein the causing act is partly performed by a flow distributor which is fitted in the water inlet of the boiler, and which is configured to contribute to a realization of a lamina flow of the water during a pumping action occurring in response to the forcing acts.

9. The method according to claim 8, wherein the forcing acts are performed by a pump which is energized by an energizing circuit, and wherein a combination of a switching device and wherein the measuring act is performed by a sensing member for causing an interruption of the energizing circuit when the temperature of the water is below a set point of the switching device.

* * * * *